(12) United States Patent
Bushey

(10) Patent No.: US 6,758,623 B2
(45) Date of Patent: Jul. 6, 2004

(54) HIGH AXIAL STIFFNESS SWIVEL JOINT

(75) Inventor: John A. Bushey, Eden Prairie, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 10/021,151

(22) Filed: Dec. 7, 2001

(65) Prior Publication Data

US 2003/0108379 A1 Jun. 12, 2003

(51) Int. Cl.[7] .................................................. F16D 3/00
(52) U.S. Cl. ......................... 403/57; 403/120; 403/373; 464/905; 464/127; 464/136
(58) Field of Search .................... 403/52, 120, 53, 403/51, 373, 55, 67, 74; 464/905, 112, 127, 134, 136

(56) References Cited

U.S. PATENT DOCUMENTS

| | | | |
|---|---|---|---|
| 1,143,596 A | | 6/1915 | Bockhoff |
| 1,343,728 A | | 6/1920 | Kopf |
| 1,812,934 A | | 7/1931 | Curtis |
| 2,395,792 A | | 2/1946 | Shea |
| 2,876,636 A | * | 3/1959 | Thackeray .............. 464/136 X |
| 3,044,282 A | | 7/1962 | Grundy |
| 4,318,572 A | | 3/1982 | Noha et al. |
| 5,458,028 A | | 10/1995 | Cleveland, III |
| 5,466,085 A | * | 11/1995 | Sheldon et al. ............ 403/53 X |
| 5,649,778 A | | 7/1997 | Lin |
| 5,752,834 A | | 5/1998 | Ling |
| 5,766,081 A | | 6/1998 | Desmarais |
| 6,257,986 B1 | * | 7/2001 | Duggan et al. .......... 464/905 X |
| 6,383,081 B1 | * | 5/2002 | DeBisschop ............ 464/905 X |

FOREIGN PATENT DOCUMENTS

| | | |
|---|---|---|
| DE | 10058317 | 5/2001 |
| FR | 2703175 | 9/1994 |
| JP | 52043055 | 4/1977 |

\* cited by examiner

Primary Examiner—Lynne H. Browne
Assistant Examiner—John R. Cottingham
(74) Attorney, Agent, or Firm—Westman, Champlin & Kelly; S. Koehler (57) ABSTRACT

A swivel joint according to the present invention includes first and second base members. A spider includes first and second arcuate surfaces which form joints with the first and second base members, respectively. Furthermore, the spider includes first and second pins both opposed from each other and third and fourth pins opposed from each other. A first mechanism is coupled to the spider and the first base member and is adapted to effect a force between the first arcuate surface and the first base member. Also, a second mechanism is coupled to the spider and the second base member and is adapted to effect a force between the second arcuate surface and the second base member.

31 Claims, 11 Drawing Sheets

HIGH AXIAL STIFFNESS SWIVEL JOINT

BACKGROUND OF THE INVENTION

The present invention relates to swivel joints. More particularly, the present invention relates to a swivel joint for transferring tension and compression forces.

Universal joints are well-known devices that couple members together, yet allow motion in two degrees of freedom. Commonly, the universal joint includes two yokes or devises with a cross or spider member disposed therebetween. Bearing surfaces on ends of the spider allow relative angular motion about two orthogonal axes.

Universal joints can be used in a variety of different applications. In many instances, the universal joint is used to transfer torque loads between coupled members. However, an universal joint having high axial stiffness for transmitting tension and compression forces would be particularly beneficial for yet other applications. However, current universal joints experience low strength and stiffness in the axial direction due to bending stresses and deflection of the spider.

SUMMARY OF THE INVENTION

A swivel joint according to one aspect of the present invention includes first and second base members. A spider further includes first and second arcuate surfaces that form joints with the first and second base members, respectively. Furthermore, the spider includes first and second pins opposed from each other and third and fourth pins opposed from each other. A first mechanism, coupling the spider and the first base member, is adapted to effect a compressive force between the first base member and the first arcuate surface. Also, a second mechanism, coupling the spider and the second base member, is adapted to effect a compressive force between the second base member and the second arcuate surface. The forces between the base members and the corresponding arcuate surfaces maintain coupling of the base members and the corresponding arcuate surfaces when subjected to external working forces, thereby preserving axial stiffness throughout the working force range in tension and compression and through the range of motion of the joint.

DETAILED DESCRIPTION OF THE PREFERRED EMBODIMENTS

Figure 1:
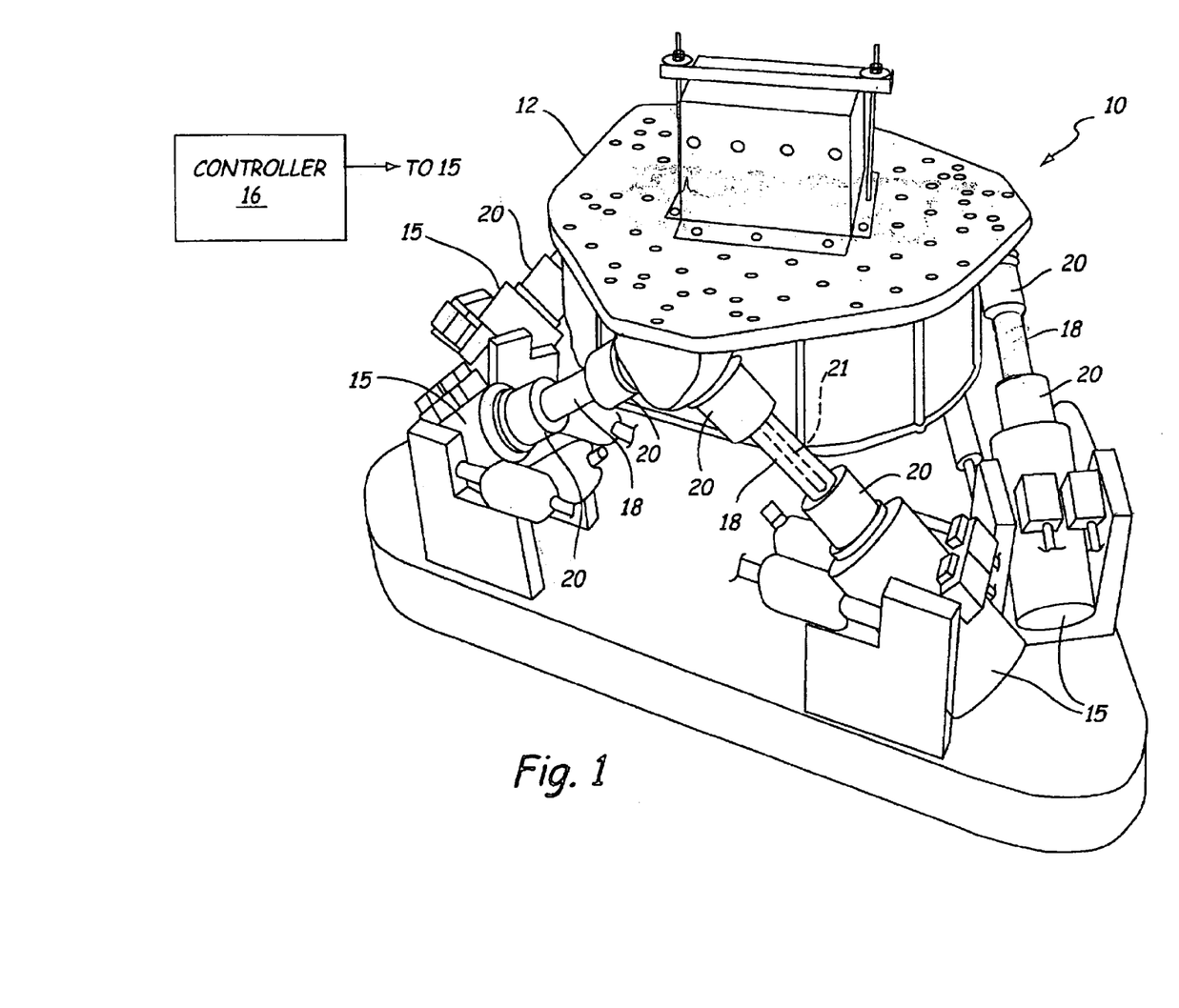
FIG. 1 is a schematic diagram of a simulation system for use with the present invention.

Before describing the universal joint in detail, an explanation of an exemplary operating environment for the universal joint and forming another aspect of the invention, may be helpful. FIG. 1 schematically illustrates an exemplary simulation system 10. The system 10 includes a table 12 for supporting a specimen 11 under test and a plurality of actuators 15 for driving the table 12 in response from a system controller 16. Struts 18 are commonly provided to couple the table 12 to each of the actuators 15. In the embodiment illustrated, swivels 20 are provided between the actuators 15 and the struts 18 and the table 12. In the embodiment illustrated, system 10 includes twelve swivels 20, however, it will be appreciated that a swivel 20 can be provided in the system 10 where needed depending upon operating parameters thereof. In one embodiment discussed below, swivels 20 can include hydrostatic bearings where fluid for the bearings can be provided by actuators 15. In addition, struts 18 can be adapted to provide fluid communication between swivels 20 through port 21. Swivels 20 are particularly useful in simulation system 10, where the swivels 20 are used for transmitting forces to a specimen or table proportionate to command inputs from controller 16. In particular, swivels 20 are configured to transmit compression and tension forces with high load capacity, high axial stiffness, and minimized backlash. Other systems can utilize swivel joint 20 including, but not limited to, other actuator assemblies (e.g. hydraulic, pneumatic, electric), robotic mechanisms and machine tools, to name a few.

Figure 2:
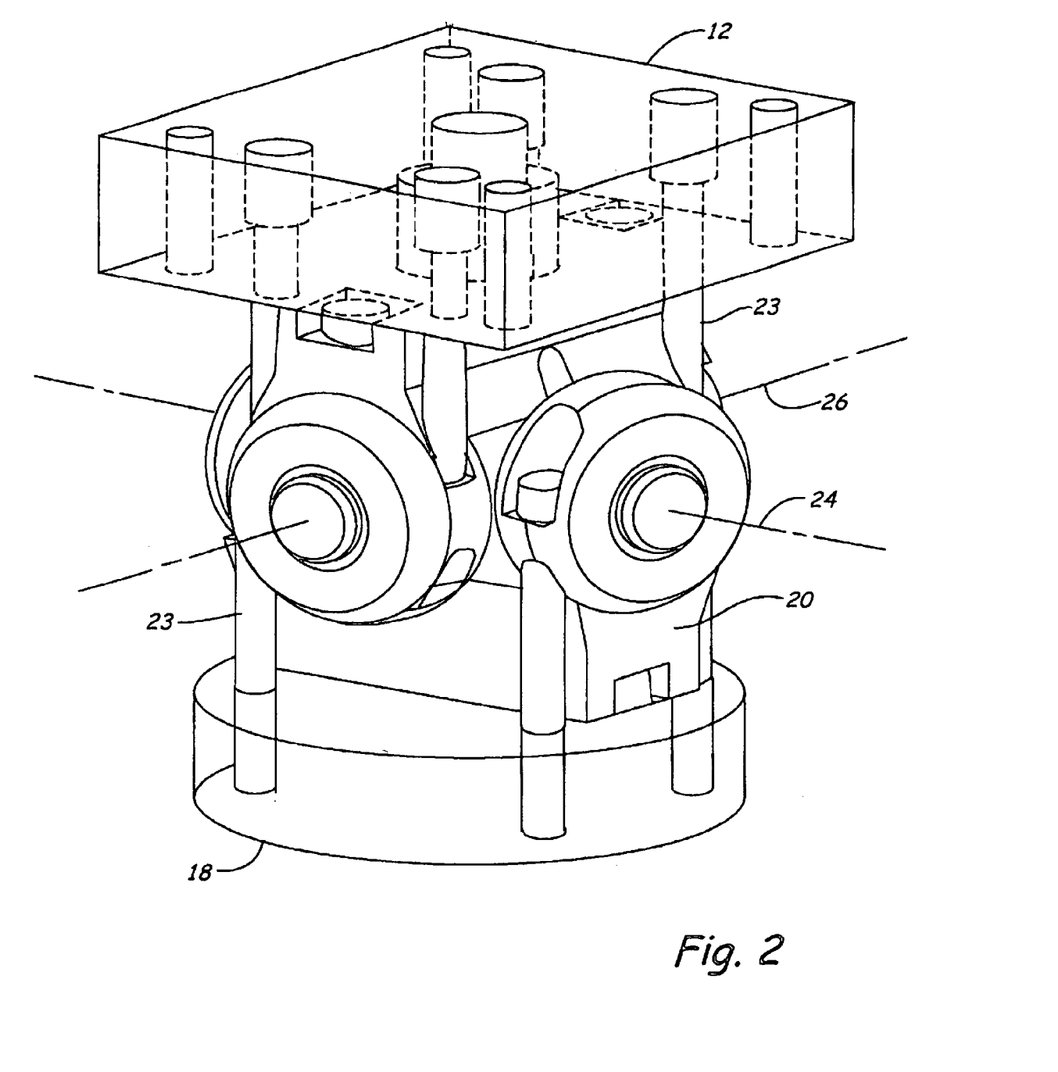
FIGS. 2 and 3 are perspective views of a swivel joint according to the present invention.
Figure 3:
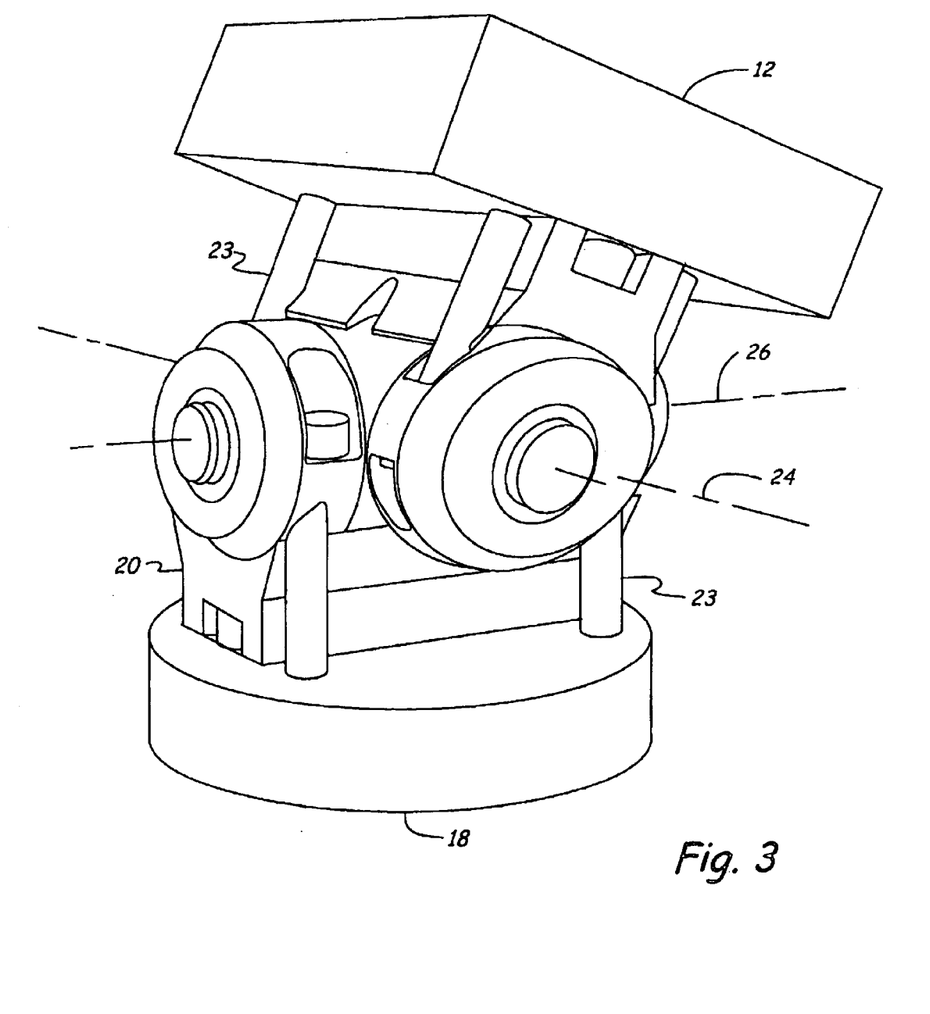

FIGS. 2–3 illustrate swivel joint 20 in more detail. Swivel 20 is secured to a portion of table 12 and strut 18 (or alternatively actuator 15) with a plurality of fasteners 23. The plurality of fasteners 23, herein illustrated as bolts, can be of any type to secure swivel joint 20 to table 12, struts 18, actuators 15 or any other member in which swivel joint 20 is useful. Swivel joint 20 is rotatable about two axes of rotation, 24 and 26. FIG. 3 illustrates swivel joint 20 rotated about axis 24. Rotation of swivel joint 20 about axes 24 and 26 can be achieved through a range of angles in order to transmit forces to table 12, as desired. In one embodiment, swivel 20 allows rotation simultaneously about axes 24 and 26 through angles greater than +/−20°; however other ranges can be provided depending on the desired application.

Figure 4:
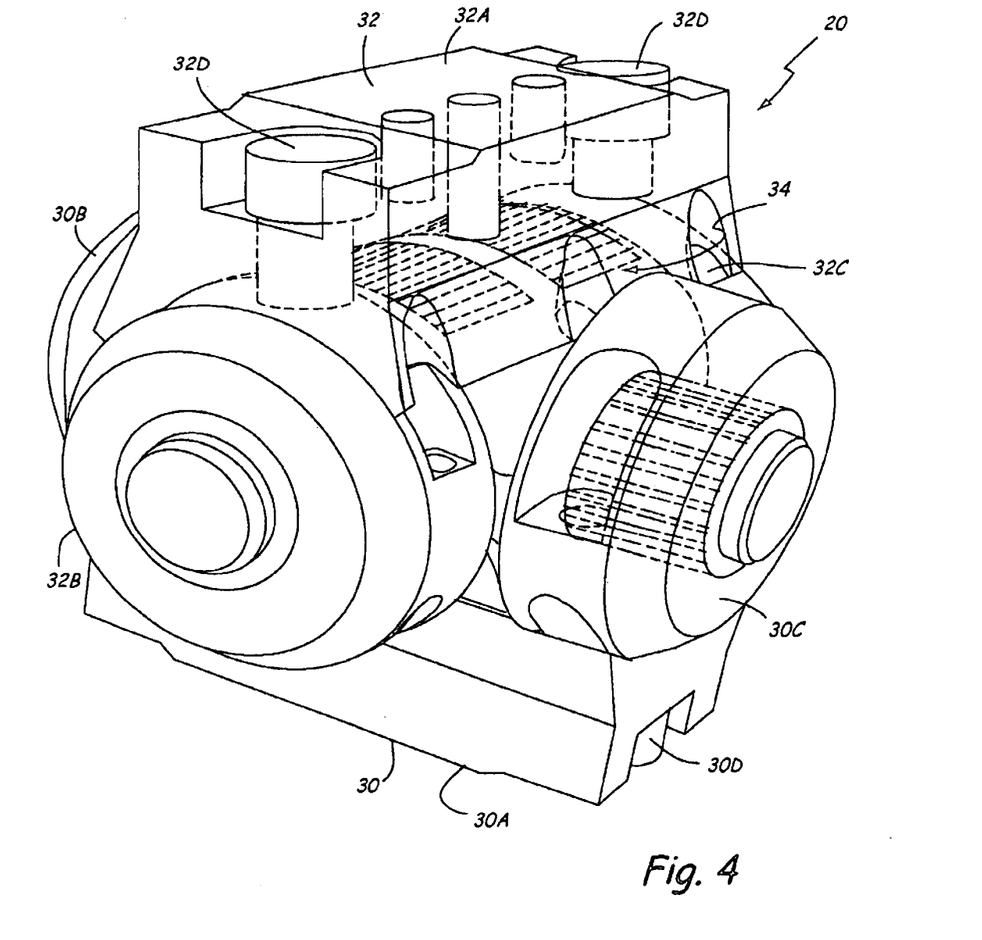
FIG. 4 is a perspective view of a swivel joint with certain elements illustrated in dashed lines.

With reference to FIG. 4, swivel joint 20 includes two yokes or clevises 30 and 32 and a spider or cross 34 disposed between clevises 30 and 32. By way of example, clevis 32 includes base member 32A, retainers 32B and 32C, and fasteners 32D. Fasteners 32D, herein illustrated as a pair of bolts, draw retainers 32B and 32C, and thus spider 34, toward base member 32A. Fasteners 32D, along with retainers 32B and 32C, effect a compressive force between base member 32A and spider 34. The force created is preferably at a level greater than a maximum tension force expected to be placed on swivel joint 20. Clevis 30 is constructed similar to clevis 32 such that base member 30A and retainers 30B and 30C effect a compressive force between base member 30A and spider 34. Clevises 30 and 32 are herein illustrated orthogonal to each other. Also, the orientation of base member 30A is opposite that of the base member 32A.

The retainers 30B and 30C, 32B and 32C, along with fasteners 30D and 32D, couple spider 34 to their respective base members 30A and 32A. Coupling of spider 34 with base members 30A and 32A creates a direct (axial) primary load path from base member 30A through spider 34 and into base member 32A and vice-versa. Presence of the primary load path allows high compressive forces to be placed on swivel joint 20, while swivel joint 20 remains rigid in an axial direction. In addition, a secondary load path exists from the base member 30A through retainers 30B and 30C, spider 34, retainers 32B and 32C and into base member 32A.

This secondary load path is less rigid than the primary load path. In addition, the secondary load path preloads the primary load path so the primary load path can handle external tension forces placed on swivel joint 20 in a rigid manner.

Figure 5:
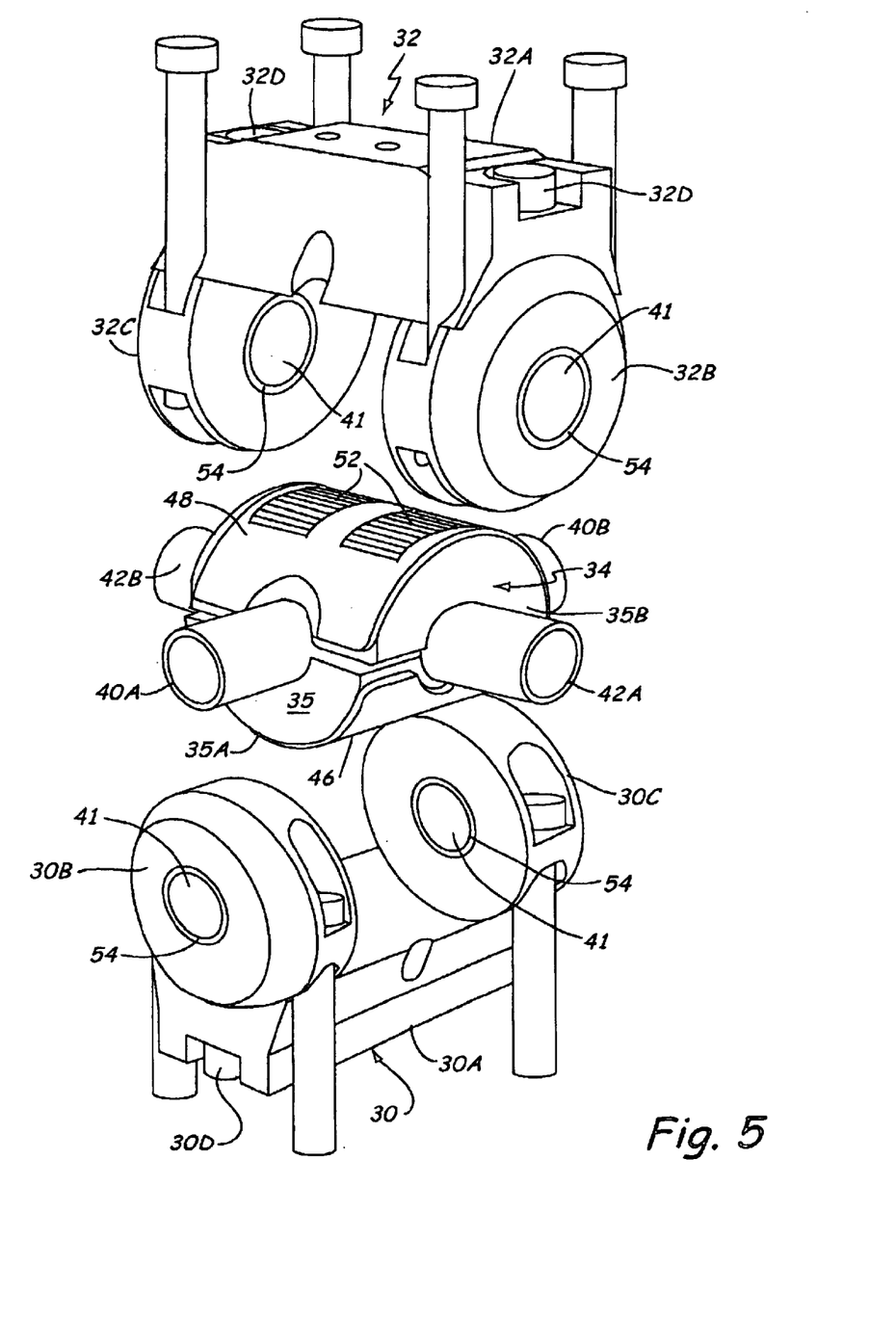
FIGS. 5 and 6 illustrate exploded views of a swivel joint according to the present invention.
Figure 6:
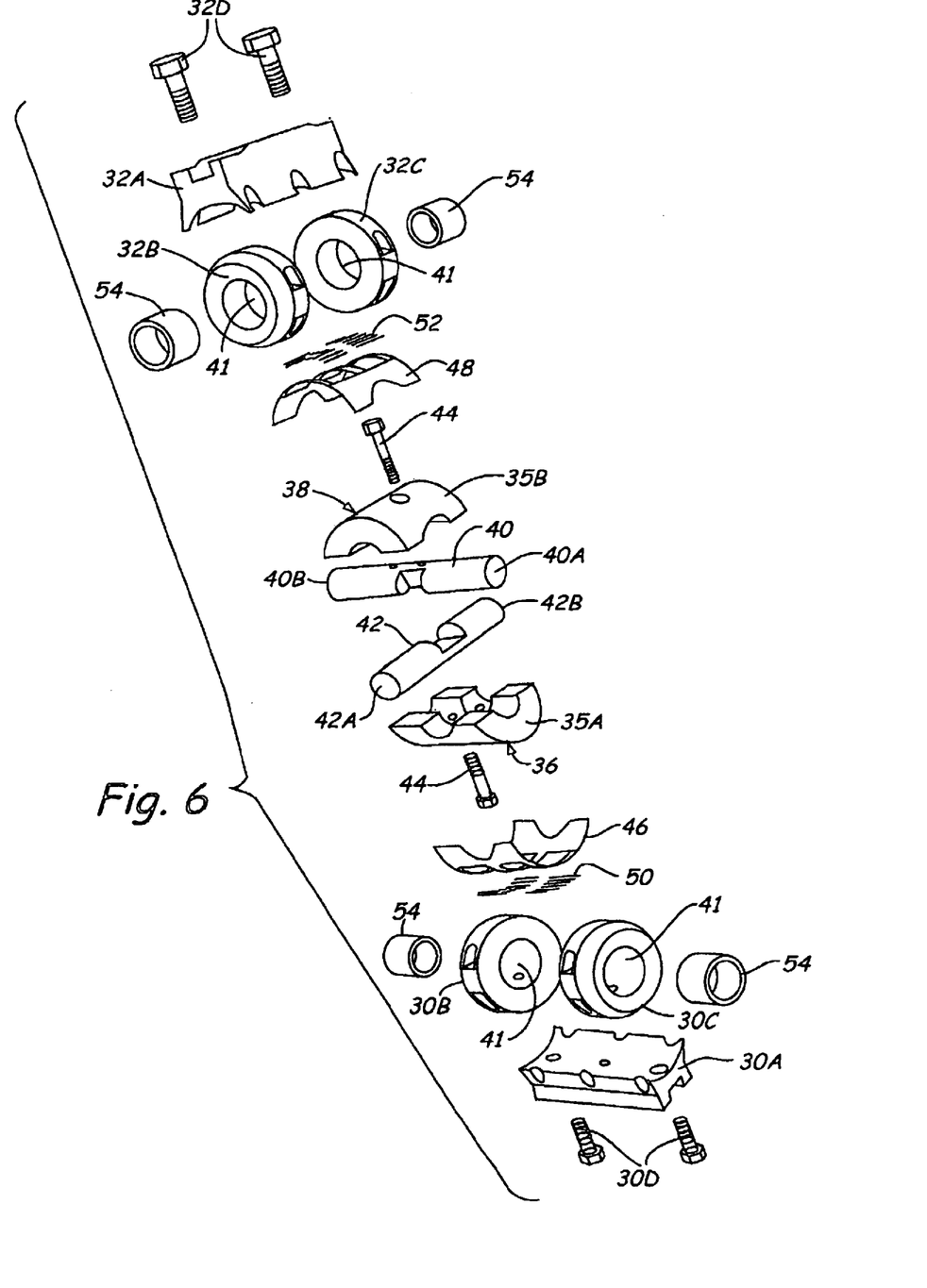

With reference to FIGS. 5 and 6, exploded views of an exemplary form of swivel joint 20 are illustrated. In this embodiment, spider 34 includes spider body 35 having a lower body portion 35A and an upper body portion 35B. Lower body portion 35A includes a first arcuate surface 36 and upper body portion 35B includes a second arcuate surface 38. Arcuate surfaces 36 and 38 are shaped substantially cylindrical, which includes cylindrical. Nevertheless, material deformation in some cases may cause uneven coupling between arcuate surfaces 36 and 38 and base members 30A and 32A. In yet another alternative embodiment, arcuate surfaces 36 and 38 can include a slight taper at its ends to even coupling between surfaces 36 and 38 and corresponding base members 30A and 32A. Pin portions 40 and 42 include pairs of opposed pins ((40A, 40B) and (42A, 42B)) which extend away from spider body 35 and are disposed in apertures 41 of each of the retainers 30B, 30C, 32B and 32C. Fasteners 44 secure spider body portions 35A and 35B together with pin portions 40 and 42 disposed therebetween. Although spider body 35 is herein illustrated and described with separate component elements, an integral assembly wherein two or more assembly elements are formed as a single body can also be used.

Plate members 46 and 48 are shaped similar to arcuate surfaces 36 and 38, respectively, and are disposed between arcuate surfaces 36 and 38 and base members 30A and 32A, respectively. Bearing surface assemblies 50 and 52 are retained in plate members 46 and 48. Bearing surface assemblies 50 and 52, herein illustrated as parallel needle rollers, provide suitable assemblies for rotation of clevises 30 and 32 along arcuate surfaces 36 and 38. A plurality of bearing surface assemblies 54 are also provided for each of the retainers 30B, 30C, 32B and 32C. Bearing surface assemblies 54 (herein needle rollers) provide suitable assemblies for rotation of pin portions 40 and 42 in apertures 41 of each retainer 30B, 30C, 32B and 32C. As those skilled in the art will recognize, alternative bearing surface assemblies such as hydrostatic bearings, balls or the like may also be used in place of bearing surface assemblies 50, 52 and 54 herein illustrated.

Construction of the individual components of swivel joint 20 can be provided in order to establish clearance between components such that a desired preload force is achieved when the components are assembled. For example, a gap can be produced between the retainers 30B, 30C, 32B and 32C and the base members 30A, 32A to create a desired preload force from fasteners 30D and 32D upon assembly. This gap is adjustable (i.e. via shims or close manufacturing tolerances) to provide different preload forces. In order to transmit tension forces effectively without backlash, the compressive force between the base members 30A, 32A and spider 34 is preferably at least 500 pounds. In another embodiment, the compressive force is at least 1000 pounds. In a further embodiment, the compressive force is at least 5000 pounds. In yet a further embodiment, the compressive force is at least 10,000 pounds.

Figure 7:
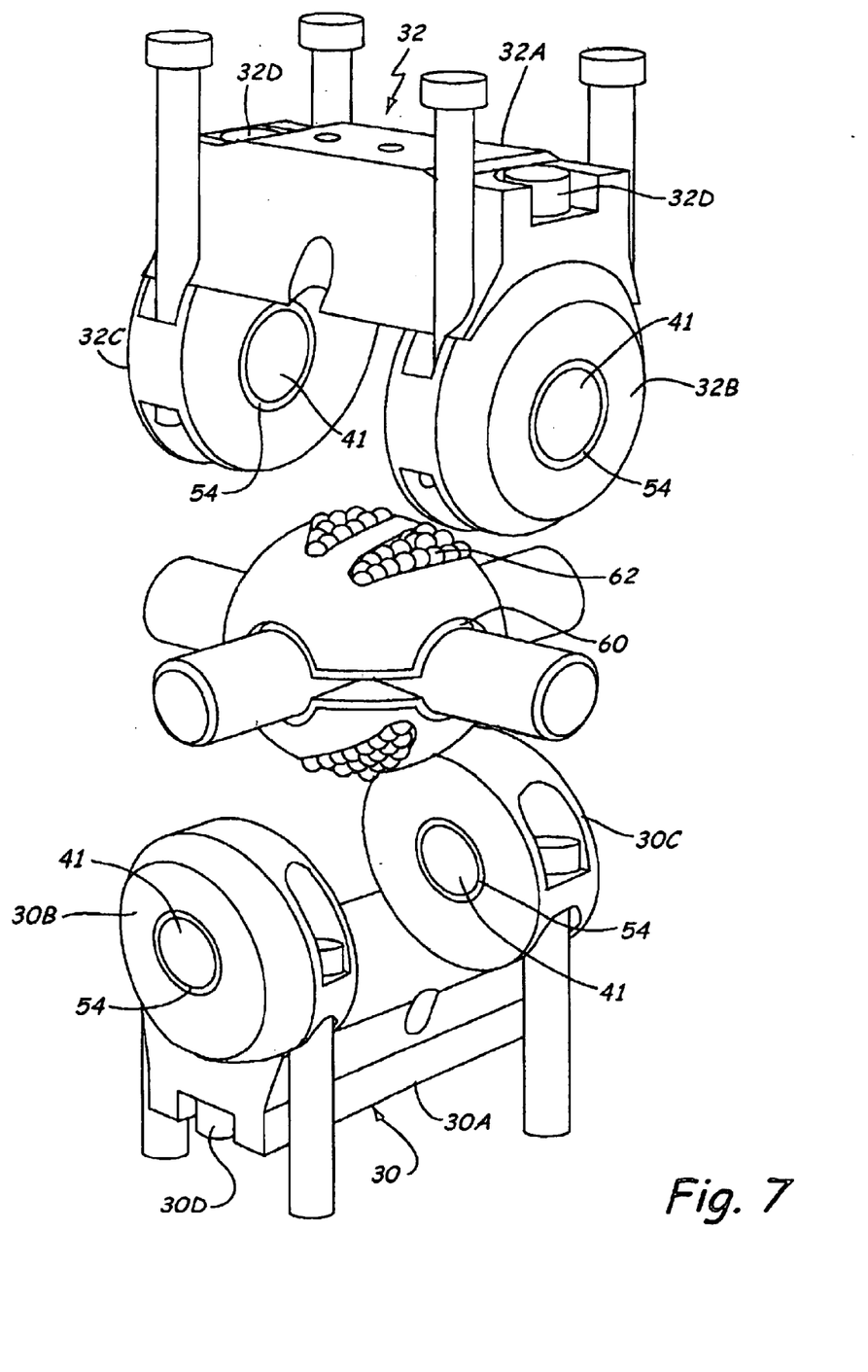
FIG. 7 is an exploded view of an alternative embodiment of a swivel joint according to the present invention.

FIG. 7 illustrates an alternative embodiment of the present invention. In this embodiment, spider 60 has arcuate surfaces that are substantially spherical, which includes spherical. The spherical surfaces of spider 60 couple to base members 30A and 32A, which hereby includes concave spherical surfaces. In one embodiment, spider 60 can be constructed of two body portions similar to spider body 35 as illustrated or alternatively one integral body wherein the pins 40A, 403, 42A, 42B can be provided or inserted. Ball bearings 62 provide suitable bearing assemblies for spider 60.

Figure 8:
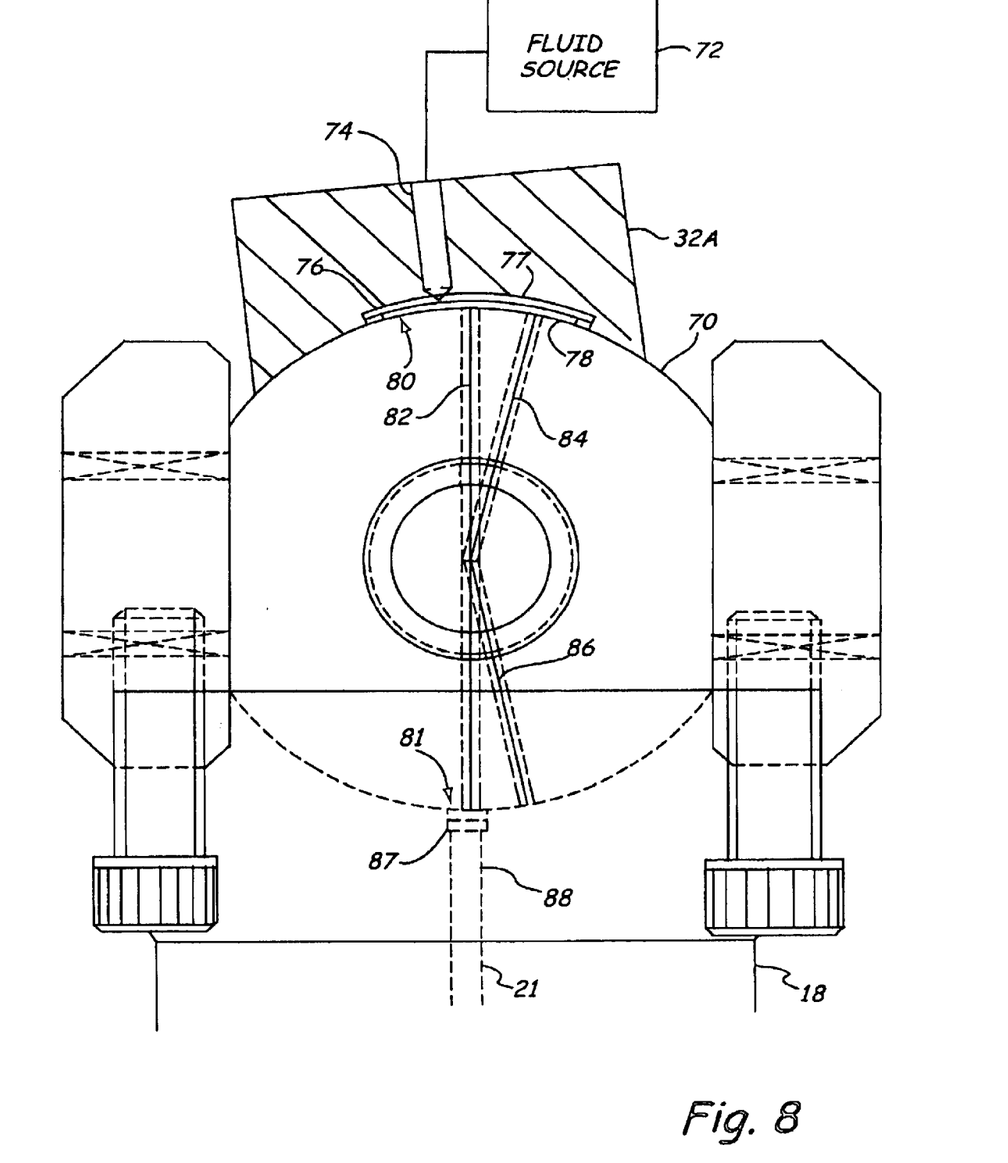
FIG. 8 is a side view of a swivel of an alternative embodiment according to the present invention.
Figure 9:
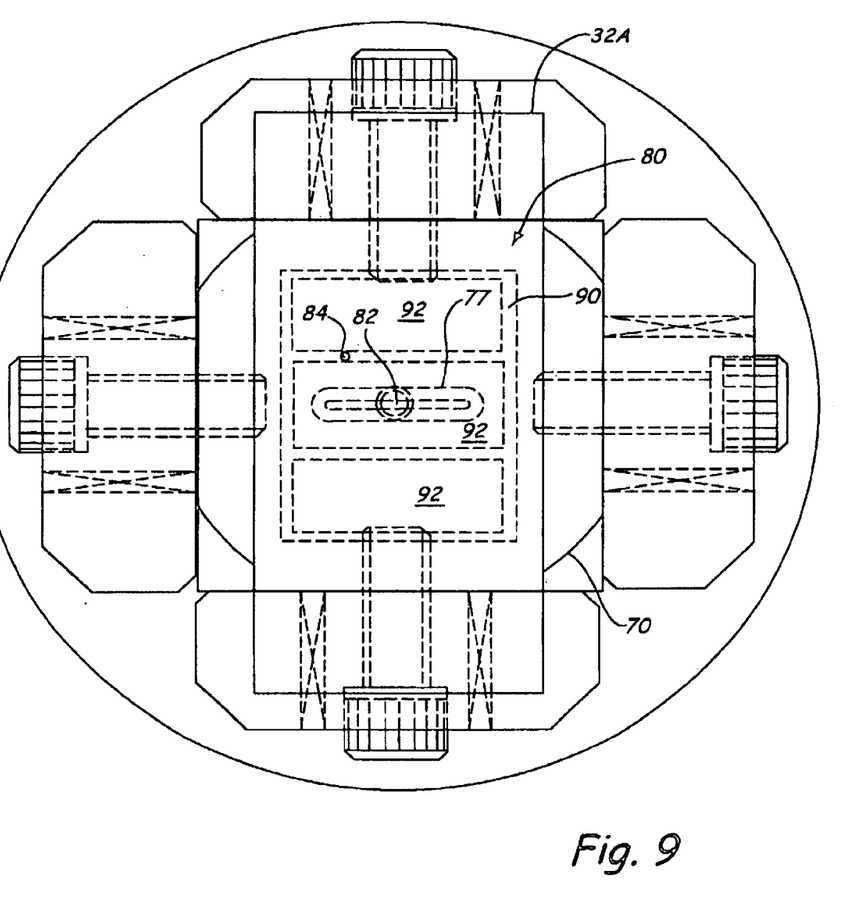
FIG. 9 is a top plan view of the swivel illustrated in FIG. 8.

FIGS. 8–9 illustrate an embodiment of the present invention in which hydrostatic bearings are utilized. In addition, a spider 70 having an integral body is illustrated. Fluid source 72 is in fluid communication with a port 74 in base member 32A. Port 74 provides fluid to a commutator 76. Commutator 76 includes a seal 77 in order that fluid passes to spider 70 without leaking to hydrostatic bearings 80 and 81 and, in the embodiment illustrated, a friction reducing member 78. Commutator 76 is adapted to be in fluid communication with a central port 82 in spider 70. Auxiliary ports 84 and 86 carry fluid from central port 82 to bearings 80 and 81. Commutator 76 minimizes the number of external connectors in order to provide fluid to the hydrostatic bearing elements. Although, if desired, separate fluid couplings can be provided for each of the base members.

Fluid can also pass through central port 82 to commutator 87, which is constructed similar to commutator 76, but orthogonally oriented relative thereto. Commutator 87 allows fluid communication to a port 88. In this manner, port 88 can be in fluid communication with another swivel 20 through passageway 21 in strut 18 such as illustrated in FIG. 1. This eliminates separate hoses for each of the swivels 20.

By way of example, bearing 80 is illustrated in FIG. 9. Fluid is delivered to bearing 80 through auxiliary port 84. A channel 90 is recessed in base member 32A to provide fluid communication to bearing 80. Channel 90 forms pads 92. Although the number of pads herein illustrated is three, any number of pads can be used. As fluid collects in channel 90, fluid pressure develops in channel 90 and eventually leaks to pads 92. Fluid pads 92 creates a suitable bearing surface for rotation between base member 32A and spider 70 and also creates a squeeze film to minimize backlash in swivel 20 when compression and tensile forces are applied.

The preload forces between the spider 34 and the base members 30A and 32A can be achieved through use of spring elements. The spring elements, as discussed earlier, create two load paths. A working load path (primary) is established by coupling arcuate surfaces 36 and 38 to respective base members 30A and 32A. This is a rigid load path that handles compressive forces. The preload or secondary load path is transferred through spring elements to provide a compressive preload to the working load path. The secondary load path is more compliant than the rigid working path. The preload path allows the rigid working load path to maintain coupling of arcuate surfaces 36 and 38 to respective base members 30A and 32A in the presence of external tension loads placed on swivel 20.

Figure 10:
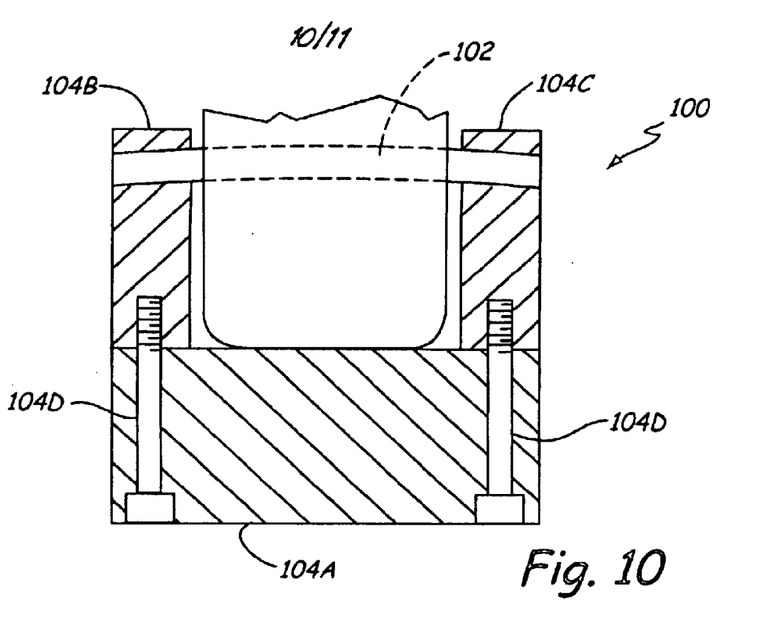
FIGS. 10–13 are schematic illustrations of alternative embodiments of the present invention.

The spring elements can take many forms. FIGS. 10–13 schematically illustrate alternative embodiments of a spring element that provides a preload force between the spider 34 and a base member of a clevis. In each of the following figures, only one half of the joint is illustrated. FIG. 10 illustrates swivel 100 including spring element 102. As illustrated, spring element 102 is a pin or pins extending between retainers 104B and 104C. Fasteners 104D draw retaining elements 104B and 104C towards base member 104A. This causes a bending moment in spring element 102. If desired, retaining elements 104B and 104C can include enlarged apertures to provide clearance for the bending spring element 102.

Figure 11:
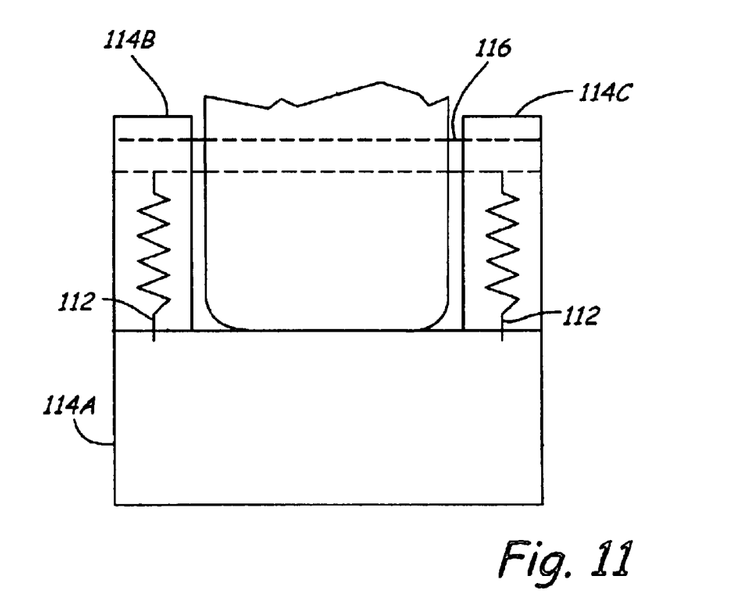

In FIG. 11, a swivel joint 110 includes spring elements 112 that are compliant and draw base member 114A towards retainer elements 114B and 114C. In this case, pin portion 116 is more rigid than spring elements 112. As desired, spring element 112 could be fasteners, retainers or any other element to provide a preload force. Depending on the material used for pins 40, 42, or fasteners 30D, 32D, the swivel joint 20 can operate according to the principles of FIGS. 10 and 11 individually or in combination.

Figure 12:
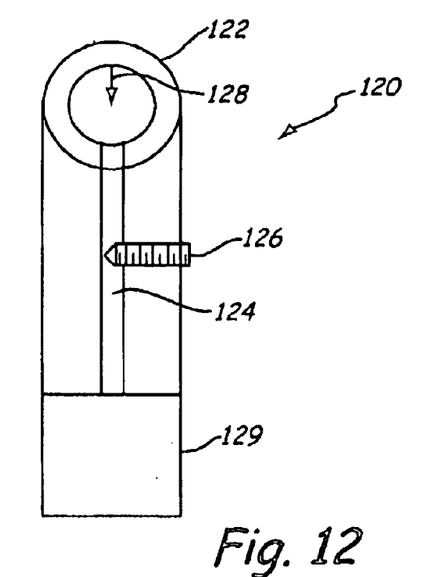

In yet another embodiment, FIG. 12 illustrates a side view of swivel joint 120 having spring element 122 comprising a retainer. A similar construction would be provided on the other side. In this case, retainer 122 includes a slot or gap 124. Element 126, herein a bolt, can be provided to increase the width of slot 124, which provides a force in the direction of arrow 128, which forces retainer 122 towards base element 129.

Figure 13:
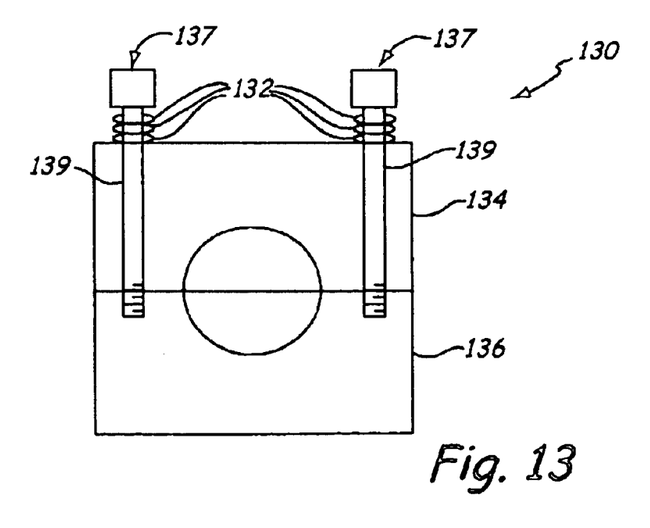

Compressive spring forces may also be used. In FIG. 13, swivel joint 130 includes a spring element 132 forcing an upper retainer element 134 towards a lower retainer element 136, which is in this case integral with a base member. For example, each fasteners 137 can include a bolt 139 inserted through an external spring element 132 (herein a spring washer stack), the bolt 139 extending through an upper retainer element 134 and threaded into a lower retainer element 136. External spring element 132 can also be a coil spring or other external spring element. FIG. 13 illustrates one side of one half of the swivel joint 130. A similar construction would be provided for each side portion of the joint.

Although the present invention has been described with reference to preferred embodiments, workers skilled in the art will recognize that changes may be made in form and detail without departing from the spirit and scope of the invention.

What is claimed is:

1. A swivel joint comprising:
   a first base member;
   a second base member;
   a spider comprising:
      first and second arcuate surfaces adapted to form joints with the first and second base members, respectively;
      first and second pins opposed from each other;
      third and fourth pins opposed from each other;
      a first mechanism coupled to the first and second pins of the spider and the first base member and adapted to effect a compressive force to draw the first base member toward the first arcuate surface; and
      a second mechanism coupled to the third and fourth pins of the spider and the second base member and adapted to effect a compressive force to draw the second base member toward the second arcuate surface.

2. The joint of claim 1 wherein:
   the first mechanism comprises:
      first and second retainers coupled to the first base member and the first and second pins;
      first and second fasteners urging the first and second retainers toward the first base member, respectively;
   the second mechanism comprises:
      third and fourth retainers coupled to the second base member and the third and fourth pins; and
      third and fourth fasteners urging the third and fourth retainers toward the second base member, respectively.

3. The joint of claim 2 wherein the first and second pins lie in a first longitudinal axis and the third and fourth pins lie in a second longitudinal axis, wherein the first and second longitudinal axes are orthogonal to each other.

4. The joint of claim 3 wherein the first and second pins comprise a first spring element and the third and fourth pins comprise a second spring element.

5. The joint of claim 2 wherein the first, second, third and fourth fasteners comprise spring elements.

6. The joint of claim 5 wherein the first, second, third and fourth fasteners include external spring elements.

7. The joint of claim 1 wherein:
   the first mechanism comprises:
      first and second retainers coupled to the first base member and the first and second pins, wherein the first and second retainers have a flexure member compliant for displacement wherein the flexure member has a gap;
      first and second elements adapted to increase the gap of the flexure members of the first and second retainers, respectively;
   the second mechanism comprises:
      third and fourth retainers coupled to the second base member and the third and fourth pins, wherein the third and fourth retainers have a flexure member compliant for displacement wherein the flexure member has a gap; and
      third and fourth elements adapted to increase the gap of the flexure members of the third and fourth retainers, respectively.

8. The joint of claim 2 wherein the first, second, third and fourth retainers are spring elements.

9. The joint of claim 1 wherein the first and second arcuate surfaces of the spider are substantially spherical.

10. The joint of claim 1 wherein the first and second arcuate surfaces of the spider are substantially cylindrical.

11. The joint of claim 2 wherein the first base member includes a first bearing surface assembly in contact with the first arcuate surface and the second base member includes a second bearing surface assembly in contact with the second arcuate surface.

12. The joint of claim 11 and further comprising a third bearing surface assembly disposed between the first pin and the first retainer, a fourth bearing surface assembly disposed between the second pin and the second retainer, a fifth bearing surface assembly disposed between the third pin and the third retainer, and a sixth bearing surface assembly disposed between the fourth pin and the fourth retainer.

13. The joint of claim 11 wherein the first and second bearing surface assemblies comprise rolling elements.

14. The joint of claim 11 wherein the first and second bearing surface assemblies are hydrostatic.

15. A multi-degree of freedom simulation system comprising:
   a specimen support;
   a plurality of actuators; and
   at least one swivel operably coupling at least one actuator to the specimen support, the swivel comprising:
      first and second arcuate surfaces adapted to form joints with the first and second base members, respectively;
      first and second pins opposed from each other;
      third and fourth pins opposed from each other;
      a first mechanism coupled to the first and second pins of the spider and the first base member and adapted to effect a compressive force to draw the first base member toward the first arcuate surface; and
      a second mechanism coupled to the first and second pins of the spider and the second base member and adapted to effect a compressive force to draw the second base member toward the second arcuate surface.

16. The system of claim 15 wherein:
the first mechanism comprises:
first and second retainers coupled to the first base member and the first and second pins;
first and second fasteners urging the first and second retainers toward the first base member, respectively;
the second mechanism comprises:
third and fourth retainers coupled to the second base member and the third and fourth pins; and
third and fourth fasteners urging the third and fourth retainers toward the second base member, respectively.

17. The system of claim 16 wherein the first and second pins lie in a first longitudinal axis and the third and fourth pins lie in a second longitudinal axis, wherein the first and second longitudinal axes are orthogonal to each other.

18. The system of claim 17 wherein the first and second pins comprise a first spring element and the third and fourth pins comprise a second spring element.

19. The system of claim 16 wherein the first, second, third and fourth fasteners comprise spring elements.

20. The system of claim 19 wherein the first, second, third and fourth fasteners include external spring elements.

21. The system of claim 15 wherein:
the first mechanism comprises:
first and second retainers coupled to the first base member and the first and second pins, wherein the first and second retainers have a flexure member compliant for displacement wherein the flexure member has a gap;
first and second elements adapted to increase the gap of the flexure members of the first and second retainers, respectively;
the second mechanism comprises:
third and fourth retainers coupled to the second base member and the third and fourth pins, wherein the third and fourth retainers have a flexure member compliant for displacement wherein the flexure member has a gap; and
third and fourth elements adapted to increase the gap of the flexure members of the third and fourth retainers, respectively.

22. The system of claim 16 wherein the first, second, third and fourth retainers are spring elements.

23. The system of claim 15 wherein the first and second arcuate surfaces of the spider are substantially spherical.

24. The system of claim 15 wherein the first and second arcuate surfaces of the spider are substantially cylindrical.

25. The system of claim 16 wherein the first base member includes a first bearing surface assembly in contact with the first arcuate surface and the second base member includes a second bearing surface assembly in contact with the second arcuate surface.

26. The system of claim 25 and further comprising a third bearing surface assembly disposed between the first pin and the first retainer, a fourth bearing surface assembly disposed between the second pin and the second retainer, a fifth bearing surface assembly disposed between the third pin and the third retainer, and a sixth bearing surface assembly disposed between the fourth pin and the fourth retainer.

27. The system of claim 25 wherein the first and second bearing surface assemblies comprise rolling elements.

28. The system of claim 25 wherein the first and second bearing surface assemblies are hydrostatic.

29. The system of claim 28 and further comprising at least two swivels and a strut coupled to the at least two swivels and adapted to provide fluid communication between the at least two swivels.

30. A swivel joint comprising:
a first base member;
a second base member;
a spider having first and second arcuate surfaces adapted to form joints with the first and second base members, respectively;
first preload means for providing a compressive preload force between the spider and the first base member; and
second preload means for providing a compressive preload force between the spider and the second base member.

31. The swivel joint of claim 30 wherein:
the spider includes first and second pins opposed from each other and third and fourth pins opposed from each other;
the first preload means include apertures for receiving the pins and coupling the spider to the first base member;
the second preload means include apertures for receiving the pins and coupling the spider to the second base member; and
upon loading of the joint, a first load path for compressive loads is formed from the first base member directly through the first and second arcuate surfaces and into the second base member and a second load path for forming the compressive loads in the first load path, the second load path including the first base member, the first and second pins, the spider, the third and fourth pins and the second base member.

* * * * *